Figure 1:
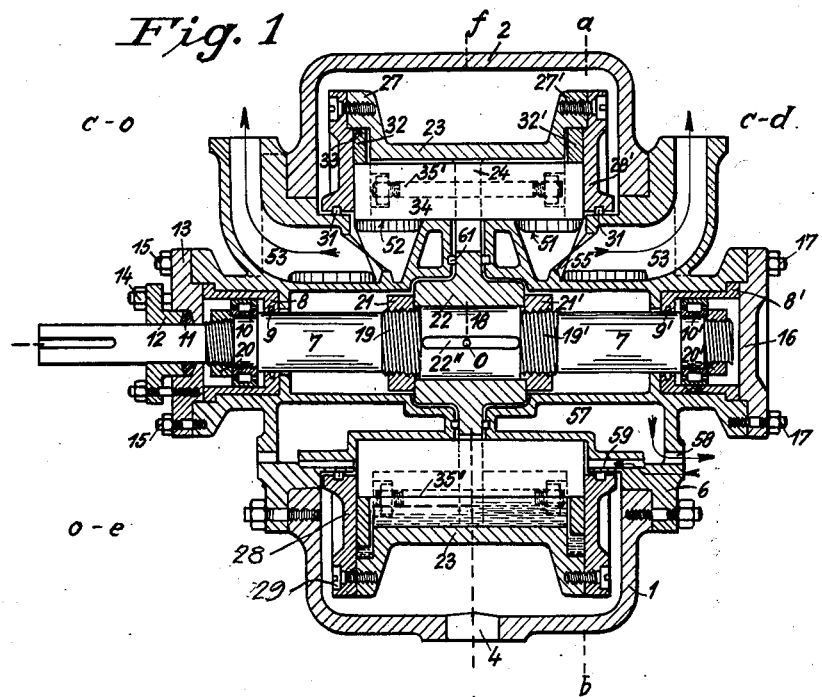

Jan. 29, 1935.    G. STAUBER    1,989,564
ROTARY MACHINE OR POWER ENGINE
Filed Dec. 6, 1932    2 Sheets-Sheet 1

G. Stauber
INVENTOR
By Marks & Clerk
ATTYS

Jan. 29, 1935.  G. STAUBER  1,989,564
ROTARY MACHINE OR POWER ENGINE
Filed Dec. 6, 1932    2 Sheets-Sheet 2

Fig.1ª

Patented Jan. 29, 1935

1,989,564

UNITED STATES PATENT OFFICE 1,989,564

ROTARY MACHINE OR POWER ENGINE

Georg Stauber, Berlin, Germany

Application December 6, 1932, Serial No. 645,987
In Germany December 12, 1931

3 Claims. (Cl. 230—79)

My invention pertains to rotary machines or power engines wherein a rotor equipped with vanes, flaps, valves, slides or the like, is provided and working chambers of variable voluminal capacity or useful clearance are formed between or confined by said vanes, flaps, slides or the like, variation of the capacity or useful clearance of said chambers being brought about by the eccentric arrangement of the rotor relative to the stator of the machine.

Machines of this type have been manufactured or suggested heretofore in quite a variety of constructions or modifications. In my prior patent, 1,900,620, dated March 7, 1933 there is disclosed a machine of this type wherein the working chambers are kept filled, during operation, with a liquid, such as water, in a manner that, during rotation, the said chambers are completely filled with water at the moment of least capacity or useful clearance. Due to the action of centrifugal force the liquid is forced outwards, during the rotation of the rotor, so as to form an annular body or ring of liquid in the cross-sectional plane of the machine, with the surface of the liquid in the several chambers acting like piston surfaces.

In my said prior Patent 1,900,620 I have further described how machines of this type must be operated and constructed in order that the said surfaces of the liquid will be prevented from disfiguration or splashing during normal operations and during the regulation or controlling of the machine and consequently even plane surfaces will be maintained and a satisfactory degree of efficiency be secured.

My invention is in some aspects an improvement on the invention or machine described and claimed in my said prior patent and the chief object thereof is especially to obviate and reduce the losses due to internal friction, it being a particularity of the improvement to be described hereinafter that the same is applicable both in connection with machines filled with a liquid agent and in connection with machines working without a liquid agent but which in principle are similar to the former.

I am aware it has been suggested heretofore to partly or totally receive and absorb the centrifugal forces of the vanes, valves, slides or the like revolving together with the rotor, by means of supporting rings which all of the vanes or the like abut against and which participate in the rotation with a certain speed. The constructions hitherto proposed to this end, however, are objectionable for the reason that the said supporting rings are guided in stationary cylindrical surfaces of the stator and consequently forced vigorously against said stationary surfaces by the working pressures of the operating agent, just as journals are frictionally forced against their bushings. Due to the sliding friction produced in constructions of this kind the supporting rings are subjected to braking action with the result of premature wear and tear of the moving and the stationary parts of the machine.

A particular object of my invention is to remedy this defect in accordance with a new rule or principle of designing rotary machines of the type herein referred to with a view to thereby prevent the said supporting rings from undue wear due to sliding on stationary guiding surfaces, and causing the same to contact with and run over rotating surfaces of the rotor, just as depending lubricating rings in shaft bearings contact with and roll over the pivot or journal of the shaft.

It will be seen that by substituting rolling supporting means for the heretofore known sliding supporting rings, the braking action will be greatly reduced and consequently the life of the machine will be considerably prolonged and the loss of energy decreased accordingly.

I will now proceed to describe my invention more in detail in connection with the embodiment thereof illustrated in the accompanying drawings forming a part of this specification and showing, for purposes of exemplification, a machine with chambers filled with a suitable liquid, and adapted to work as a compressor for the compression of air. It will be evident, however, that a machine of the type shown, if slightly modified, may be used for forwarding inelastic driving fluids or even as a power-engine, the mode of operation being the same in principle in all such eventualities.

Figure 2:
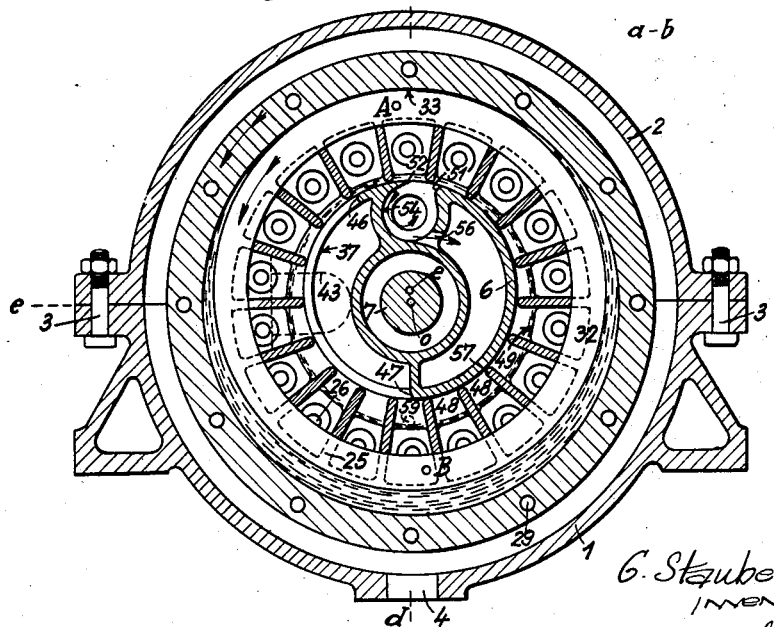
Figure 3:
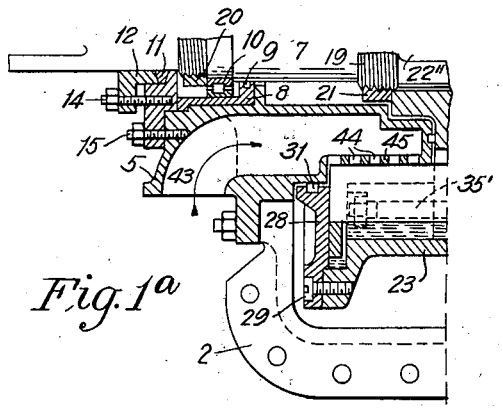
Figure 3:
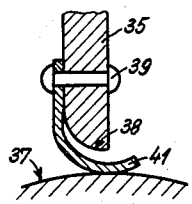
Figure 4:
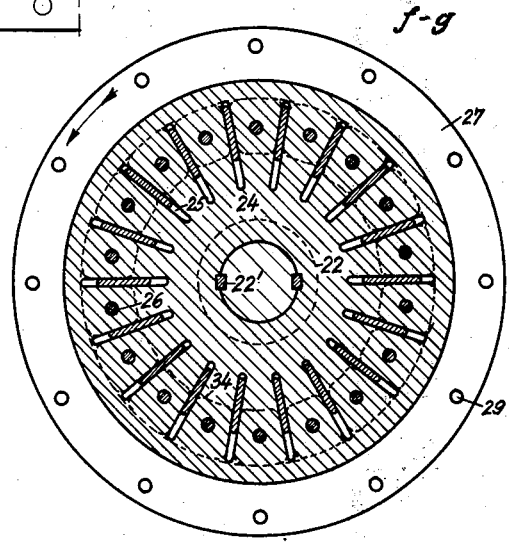
Figure 5:
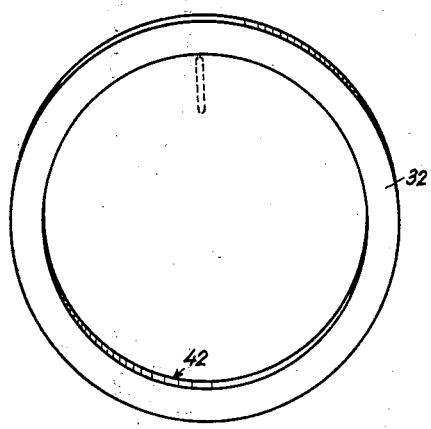
Figure 7:
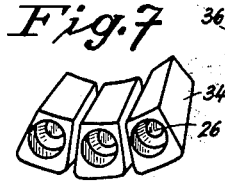
Figure 6:
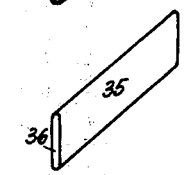

In these drawings, Figure 1 is a view in longitudinal section of the machine, on the line c—d of Fig. 2; Fig. 1a is a fragmentary section on the line o—e of Figure 2; Figure 2 is a view in cross-section of the machine on the line a—b of Figure 1; Figure 3 shows a constructional detail; Figure 4 is a section on the line f—g of Figure 1; Figure 5 is a perspective view of one of the supporting rings; Figure 6 is a perspective view of one of the slides, and Figure 7 a similar view of three juxtaposed blocks spaced for the reception of said slides.

In the embodiment shown, the symmetrical machine, properly speaking, is housed in a casing composed of an upper member 2 and a lower member 1, see Figures 1 and 2, the two members being firmly interconnected by screw-bolts 3 and the lower member 1 being provided with an outlet port 4 both for the removal of water that may have entered into the casing inadvertently or by chance, and for the elimination of air. Mounted in the casing is a cylinder for controlling the inlet and outlet ports. The said cylinder comprises two halves or members 5 and 6 of cast metal, for example, and of substantially cylindrical configuration. The member 5 of the cylinder is adapted to support the one bearing of the shaft 7, shaped to form a sleeve or bushing 8 with a packing ring 9 or the like. A roller-bearing 10 within the sleeve 8 is attached to the shaft by means of a nut 20 screwed on a threaded portion of the shaft. A stuffing box 13 on the shaft is firmly connected with the member 5 of the cylinder by bolts and nuts 15 so as to secure the sleeve 8 in its position, the packing 11 of the stuffing box being compressed, as usual, by a gland 12 and gland-bolts 14.

The other end of the shaft 7 is journalled in a suitable bearing 10' comprising a sleeve or bushing 8' of similar construction and adaptation secured in place by a cover-plate 16 and screw-bolts 17.

At a point midway between its supported ends the shaft is of increased diameter and the two portions of the shaft adjacent to the enlarged median portion 18 are threaded as at 19 and 19' for the reception of nuts 21 and 21', respectively adapted and serving to secure a hub-like member 22 in position on the said enlarged portion 18, the said member 22 being also prevented from rotation about the shaft 7 by means of cotters 22' driven into corresponding key-ways 22'' of the shaft portion 18.

Mounted on the hub-like member 22 is a disk 24 carrying a tubular body 23 and it will be seen that the three parts 22, 23 and 24, which may be formed integrally, constitute the rotor of the machine. The disk 24 is provided with radial slits 25 and with a plurality of bores 26 close by each other in a concentric circular line. Circumferentially projecting from the two ends of the tubular body or cylinder 23 there are flanges 27 and 27', respectively, for the covers 28 to be attached thereto by means of screws 29, so that the covers 28 will rotate simultaneously with the rotor 23, 22, 24. The hollow space confined by the parts 22, 23, 24 and 28 is closed airtight, relative to the controlling cylinder 5, 6 by means of any suitable packings 31.

Within the hollow cylinder 23 of the rotor are two annular members or rings 32 and 32' which form a particularly essential feature of the present invention. The said rings 32 and 32' are loose members, that is to say, they are in no way connected with the rotor of the machine, and they are in contact with the inner surface 33 of the tubular body or cylinder 23. The purpose and operation of the two rings 32 and 32' will be explained hereinafter.

Mounted in the hollow space formed by the members 22, 23, 24 and 28 of the rotor, are two circular rows of guiding blocks 34, each row comprising a like or predetermined member of blocks and the one row being located on the one side of the disk 24, while the other row is located on the other side thereof. These blocks 34 are interconnected by threaded bolts or rods 35 passing through bores 26 of the disk 24. The blocks 34 are of trapeziform cross-section and spaced apart from each other to leave or form interstices of the same width as and corresponding to the slits 25 of the disk 24. The slits 25 serve to receive and guide flat slides 35, one of which is shown separately in Figure 6 and which are adapted to abut with their end edges 36 against the covers 28, while the outer longitudinal edges thereof are in contact with the inner surfaces of the rings 32 and 32'. These revolving members are arranged to operate in the following manner:

The controlling cylinder 5, 6 has in the interior of the machine, a cylindrical outer surface which is located eccentrically to the centre o of rotation or the longitudinal axis of the shaft 7. The degree of eccentricity can be seen upon inspection of Figure 2, wherein o designates the centre of rotation or the axis of the revolving shaft 7, while e denotes the centre of the eccentric peripheral surface of the controlling cylinder 5, 6, the said peripheral surface of the cylinder being denoted by the reference character 37 in Figures 2 and 3.

The free inner diameter of the rings 32 now is just so much greater than the diameter of the outer peripheral surface 37 of the controlling cylinder as to provide sufficient room between the parts for the accommodation of the slides 35. Consequently the slides always move with their lower edges 38, see Figure 3, over and in contact with the surface 37, thereby establishing a tight closure, to a certain extent, and serving at the same time, as a guide for the rings 32 which necessarily must occupy an eccentric position in the cylinder 23 of the rotor even when the machine is at rest. In order to ensure a more reliably tight contact between the slide 35 and the surface 37 of the controlling cylinder, the edge 38 of the slide 35 may be equipped with a resilient sliding shoe 41 and secured to the slide by means of rivets 39 or the like.

From the foregoing description, it will now be apparent, that the positions of the rings 32 with relation to the rotor are invariably settled or determined, although they are in no way connected with the rotor of the machine. When the rotor rotates the rings are pressed by the slides 35 due to centrifugal action, towards and against the inner surface 33 of the rotor, so as to roll or run on the said surface 33, while the rotor thus transmits its movement to the rolling rings 32. When the point A of the ring 32, see Figure 2, gradually approaches and comes up to the point B during rotation, the inner surfaces 42 of the rings 32 will act to guide the outer edges of the slides 35 in a manner that the lower edges 38 of the latter will always be and remain in contact with the peripheral surface 37 of the controlling cylinder.

In the peripheral surface 37 of the controlling cylinder there are provided the several apertures for the admission and the discharge of the air. In Fig. 1a the reference character 43 denotes the air-admission pipe mounted in the member 5 of the controlling cylinder, communication between the pipe 43 and the interior of the revolving rotor being established by the port 44 which, extending from the edge or point 46 to the point 47, as shown in Figure 2, may be subdivided by bridges 45 to form a kind of a grate, see Figure 1. The edge 46 in Figure 2 thus is the controlling edge at or for the beginning of the air-admission and the edge 47 is the controlling edge at or for the end thereof. As rotation continues, the volume of air enclosed in the chambers 48, see Figure 2, will be compressed, due to the eccentricity of the controlling or distributing cylinder, 5, 6 by the surface of the liquid aproaching more and more the outer surface of the said cylinder, until the edge 51 is reached. This edge 51 controls the commencement of the air discharge, while the edge 52 controls the end of the air discharge. The air escaping, through the outlet port confined by the edges 51 and 52, into the pipe 53 will be caused by the curved shape of the surface 54 to turn, a blade 55 being mounted in the pipe 53 for the purpose of freeing the air, by centrifugal action, from water contained therein. The water thus separated from the air will escape through the port 56 into the chamber 57 of the controlling cylinder, see Figure 2, and will be discharged therefrom through the port 58 see Figure 1, while the air thus freed from water will ascend in and be discharged through the two pipes 53 at the top of the machine.

The water enclosed in the chambers formed in the rotor by the slides 35, is thrown outwards by centrifugal action due to the rotation of the rotor so as to form a co-revolving water ring, thereof the inner surface is indicated in Figure 2. Each volume of water of the chambers 48 between the slides 35 acts in the manner of a piston or plunger. In my prior Patent 1,900,620 I have described in detail the means required for maintaining the surface of the water intact, or smooth and preventing the same from splashing. In the improvements according to the present invention such means are not required as the danger of splashing is not so imminent, provided that a correct degree of eccentricity is secured.

For the purpose of supplying the rotor with water an inlet port 59 is provided in the controlling cylinder 5, 6, and this port may also be used for replenishing purposes in case of loss of water during the operation of the machine. Furthermore if desired the said port may be a suitable means for regulating the efficiency of the machine, as likewise described in detail in my prior Patent 1,900,620.

In order to keep the working chambers of the rotor perfectly tight at the interstices between the disk 24 and the two cylinder members 5 and 6, packings 61 of any appropriate material may be provided at the proper places.

In my prior patent the rotary flaps or valves between which the water and the air to be compressed are enclosed, slide with high speeds over and along guiding surfaces, whereas in the modification of the machine according to the present invention, rolling friction of the rings 32 moving over the surfaces 33 of the rotor is substituted for the sliding friction of the prior case. In this way the mechanical efficiency of the machine will be greatly improved. Furthermore due to the provision of the hereinbefore mentioned water ring there is no necessity of lubricating the inner parts of the machine, since the water itself will act as a lubricant.

It will be evident that my present invention, while still being adhered to in its main essentials, may be varied and adapted in many ways according to requirements desired or most suitable under different circumstances. Moreover, the rotor and the stator may be constructed and arranged in a manner that the inner surfaces of the supporting rings are in contact with and roll over the rotor surface, instead of the outer surfaces thereof.

Furthermore, I do not desire to be limited to the employment of flat slides 35, since they may be of any other suitable shape. In such a case the centrifugal action may just as well be received by supporting rings which are similar to the rings 32 shown, and adapted to roll over and along the circular surface of the rotating rotor. Finally, the principle underlying the present invention obviously is also applicable in connection with machines requiring no water supply. In the latter case, of course, the provision of particular lubricating means will be indispensable.

What I claim is:

1. In a machine or engine driven by or delivering gases, a cylindrical casing provided with appropriate inlets and outlets for the fluid to be compressed, an eccentrically situated rotor slides on the rotor confining working chambers adapted to vary their voluminal capacity during rotation due to the eccentric position of the rotor, and a plurality of rings whereof the inner surfaces are adapted to contact with the outer edges or surfaces of the said slides, said rings participating in the rotation.

2. In a machine or engine driven by or delivering gases, a cylindrical casing provided with appropriate inlets and outlets for the fluid to be compressed, an eccentrically located rotor composed of two members and slides, which confine working chambers adapted to vary their voluminal capacity during rotation due to the eccentric location of the rotor, and at least one ring whereof the inner surface is adapted to contact with the outer edges of the said slides while the outer surface thereof is adapted to contact with a point of the inner surface of the one or the other of the members constituting the rotor.

3. In a machine or engine driven by or delivering gases, a cylindrical casing provided with appropriate inlets and outlets for the fluid to be compressed, an eccentrically positioned rotor, slides on the rotor which confine working chambers adapted to vary their voluminal capacity during rotation due to the eccentric position of the said rotor, and which are filled with a liquid whereof the surface acts in the manner of a piston, and a plurality of rings whereof the inner edges or surfaces are adapted to contact with the outer edges or surfaces of the slides and which participate in the rotation.

GEORG STAUBER.